(12) United States Patent
Iwai et al.

(10) Patent No.: US 10,542,418 B2
(45) Date of Patent: Jan. 21, 2020

(54) SERVICE PROVIDING SYSTEM, GATEWAY DEVICE, INFORMATION COLLECTION METHOD AND NON-TRANSITORY COMPUTER READABLE MEDIUM STORING PROGRAM

(71) Applicant: NEC Corporation, Tokyo (JP)

(72) Inventors: Takanori Iwai, Tokyo (JP); Hajime Zembutsu, Tokyo (JP); Hironori Magatani, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 14/397,043

(22) PCT Filed: Apr. 23, 2013

(86) PCT No.: PCT/JP2013/002729
§ 371 (c)(1),
(2) Date: Oct. 24, 2014

(87) PCT Pub. No.: WO2013/161278
PCT Pub. Date: Oct. 31, 2013

(65) Prior Publication Data
US 2015/0334556 A1     Nov. 19, 2015

(30) Foreign Application Priority Data
Apr. 26, 2012    (JP) ................................ 2012-101827

(51) Int. Cl.
*H04W 8/20*      (2009.01)
*H04L 29/08*     (2006.01)
(Continued)

(52) U.S. Cl.
CPC ............... *H04W 8/20* (2013.01); *H04L 67/20* (2013.01); *H04W 4/029* (2018.02); *H04W 4/70* (2018.02)

(58) Field of Classification Search
CPC ....... H04W 28/12; H04W 12/06; H04W 4/02; H04W 8/16; H04W 12/02; H04W 12/08; H04W 8/10; H04W 48/08; H04W 4/029
(Continued)

(56) References Cited

U.S. PATENT DOCUMENTS 8,107,973 B1 *   1/2012   Sjothun ................. G01C 21/20
                                                               455/404.2
8,391,886 B1 *   3/2013   Thaper .............. H04M 3/42348
                                                               455/414.1
(Continued)

FOREIGN PATENT DOCUMENTS

JP      2004-048289 A     2/2004
JP      2005-521299 A     7/2005
(Continued)

OTHER PUBLICATIONS

International Search Report corresponding to PCT/JP2013/002729, dated Jun. 25, 2013, 1 page.
(Continued)

*Primary Examiner* — Matthew C Sams
(74) *Attorney, Agent, or Firm* — Wilmer Cutler Pickering Hale and Dorr LLP

(57) ABSTRACT

To provide a service providing system capable of providing network information flexibly in response to a request from a server provided by a third party so as to provide services using various information, the service providing system includes an information collection unit (10) that collects node holding information held by each node device in a mobile communication network when a service information acquisition request needed for providing a service is transmitted from a service providing server (50) located in an external communication network, an information generation unit (20) that generates mobile communication network information based on the node holding information collected (Continued)

from each of node devices (41) to (43), and a communication unit (30) that transmits the mobile communication network information to the service providing server (50).

14 Claims, 9 Drawing Sheets

(51) Int. Cl.
   *H04W 4/70* (2018.01)
   *H04W 4/029* (2018.01)
(58) Field of Classification Search
   USPC .................................. 455/414.1–4; 726/1–5
   See application file for complete search history.

(56) References Cited

U.S. PATENT DOCUMENTS

| | | | | |
|---|---|---|---|---|
| 8,505,077 | B2* | 8/2013 | Kulkarni | G06F 21/31 709/225 |
| 8,750,824 | B2* | 6/2014 | Kanamatareddy | G06F 17/30528 370/352 |
| 9,026,081 | B2* | 5/2015 | Han | H04W 48/02 455/411 |
| 9,473,971 | B2* | 10/2016 | Kim | H04W 4/70 |
| 10,404,677 | B2* | 9/2019 | Zhang | H04L 63/1416 |
| 2003/0153332 | A1* | 8/2003 | Evensen | H04W 8/16 455/456.2 |
| 2004/0033803 | A1* | 2/2004 | Varonen | H04W 4/02 455/435.1 |
| 2004/0127229 | A1* | 7/2004 | Ishii | H04W 4/02 455/456.1 |
| 2004/0203630 | A1* | 10/2004 | Wang | H04M 3/42229 455/414.1 |
| 2006/0084431 | A1* | 4/2006 | Hua | H04W 8/12 455/433 |
| 2008/0267153 | A1* | 10/2008 | Mukherjee | H04L 63/104 370/338 |
| 2009/0067628 | A1* | 3/2009 | Pudney | H04L 63/0853 380/247 |
| 2010/0009657 | A1* | 1/2010 | Dingler | H04W 4/02 455/411 |
| 2010/0035636 | A1* | 2/2010 | Enzmann | H04L 63/101 455/456.5 |
| 2010/0330962 | A1* | 12/2010 | Han | H04W 48/02 455/411 |
| 2011/0138480 | A1* | 6/2011 | Janoulis | H04W 8/16 726/28 |
| 2011/0173545 | A1* | 7/2011 | Meola | G06F 21/6218 715/743 |
| 2012/0214480 | A1* | 8/2012 | Ionescu | H04W 4/001 455/425 |
| 2013/0051226 | A1* | 2/2013 | Elefant | H04W 28/02 370/230 |
| 2013/0150052 | A1* | 6/2013 | Zisimopoulos | H04W 48/18 455/437 |
| 2014/0221026 | A1* | 8/2014 | Xu | H04W 4/14 455/466 |
| 2019/0028454 | A1* | 1/2019 | Zhang | H04W 4/70 |

FOREIGN PATENT DOCUMENTS

| | | |
|---|---|---|
| JP | 2005-259099 A | 9/2005 |
| JP | 2010-165112 | 7/2010 |
| WO | WO-2003-079655 | 9/2003 |

OTHER PUBLICATIONS

3GPP "3rd Generation Partnership Project; Technical Specification Group Services and System Aspects; System Improvements for Machine-Type Communications; (Release 11)", 3GPP TR 23.888 V1.4.0, Aug. 5, 2011, 139 pages.

3GPP "3rd Generation Partnership Project; Technical Specification Group Services and Systems Aspects; Architecture Enhancements to Facilitate Communications with Packet Data Networks and Applications (Release 11)" 3GPP TS 23.682 V11.0.0, Mar. 14, 2012, 24 pages.

Extended European Search Report corresponding to European Application No. 13780581.8, dated Dec. 3, 2015, 8 pages.

Japanese Office Action issued by the Japan Patent Office for Japanese Application No. 2014-512357 dated May 30, 2017 (5 pages).

* cited by examiner

SERVICE PROVIDING SYSTEM, GATEWAY DEVICE, INFORMATION COLLECTION METHOD AND NON-TRANSITORY COMPUTER READABLE MEDIUM STORING PROGRAM

CROSS-REFERENCE TO RELATED APPLICATIONS

This application is a national stage application of International Application No. PCT/JP2013/002729 entitled "SERVICE PROVIDING SYSTEM, GATEWAY DEVICE, INFORMATION COLLECTION METHOD AND NON-TRANSITORY COMPUTER READABLE MEDIUM STORING PROGRAM" filed on Apr. 23, 2013, which claims priority to Japanese Patent Application No. 2012-101827 filed on Apr. 26, 2012, the disclosures of which are hereby incorporated by reference in their entirety.

TECHNICAL FIELD

The present invention relates to a service providing system and, particularly, to a service providing system that provides services by coordination of a mobile communication network and a service providing server.

BACKGROUND ART

Various services are provided to mobile communication devices such as mobile phone terminals by service providers different from mobile telecommunications carriers today. With an increase in service providers different from mobile telecommunications carriers, there is an advantage that provided services are diversified and users can receive a wide variety of services.

Patent Literature 1 discloses a system that provides a service to a mobile information terminal by coordination of a sensor, the mobile information terminal and an application server. To be specific, the mobile information terminal acquires a plurality of sensor information. Further, the mobile information terminal transmits the acquired sensor information to the application server. Then, the application server generates advice information based on the sensor information transmitted from the mobile information terminal and transmits it to the mobile information terminal. The mobile information terminal can thereby receive an advice service based on the sensor information.

CITATION LIST

Patent Literature

PTL1: Japanese Unexamined Patent Application Publication No. 2010-165112

SUMMARY OF INVENTION

Technical Problem

In service provision using a server provided by a third party such as an application server, it is desired to provide a service using various information, not only information transmitted from a mobile terminal. One possible example is to provide a service in a server provided by a third party by using network information or the like held by a mobile telecommunications carrier. However, there is a problem that the existing mobile communication network does not have a configuration to flexibly provide network information or the like in response to a request from a server provided by a third party.

To solve the above problem, an exemplary object of the present invention is to provide a service providing system, a gateway device, an information collection method and a program that can provide network information flexibly in response to a request from a server provided by a third party.

Solution to Problem

A service providing system according to a first exemplary aspect of the present invention includes an information collection means for collecting node holding information held by each node device in a mobile communication network when a service information acquisition request needed for providing a service is transmitted from a service providing server located in an external communication network, an information generation means for generating mobile communication network information based on the node holding information collected from each node device, and a communication means for transmitting the mobile communication network information to the service providing server.

A gateway device according to a second exemplary aspect of the present invention includes an information collection unit that collects node holding information held by each node device in a mobile communication network when a service information acquisition request needed for providing a service is transmitted from a service providing server located in an external communication network in order to transmit the node holding information to an information generation device that generates mobile communication network information based on the node holding information held by each node device in the mobile communication network and transmits the mobile communication network information to the service providing server.

An information collection method according to a third exemplary aspect of the present invention includes collecting node holding information held by each node device in a mobile communication network when a service information acquisition request needed for providing a service is transmitted from a service providing server located in an external communication network in order to transmit the node holding information to an information generation device that generates mobile communication network information based on the node holding information held by each node device in the mobile communication network and transmits the mobile communication network information to the service providing server.

A program according to a fourth exemplary aspect of the present invention causes a computer to execute a step of collecting node holding information held by each node device in a mobile communication network when a service information acquisition request needed for providing a service is transmitted from a service providing server located in an external communication network in order to transmit the node holding information to an information generation device that generates mobile communication network information based on the node holding information held by each node device in the mobile communication network and transmits the mobile communication network information to the service providing server.

Advantageous Effects of Invention

According to the above-described exemplary aspects of the present invention, it is possible to provide a service providing system, a gateway device, an information collection method and a program that can provide network information flexibly in response to a request from a server provided by a third party in order to provide services using various information.

DESCRIPTION OF EMBODIMENTS

First Exemplary Embodiment

Figure 1:
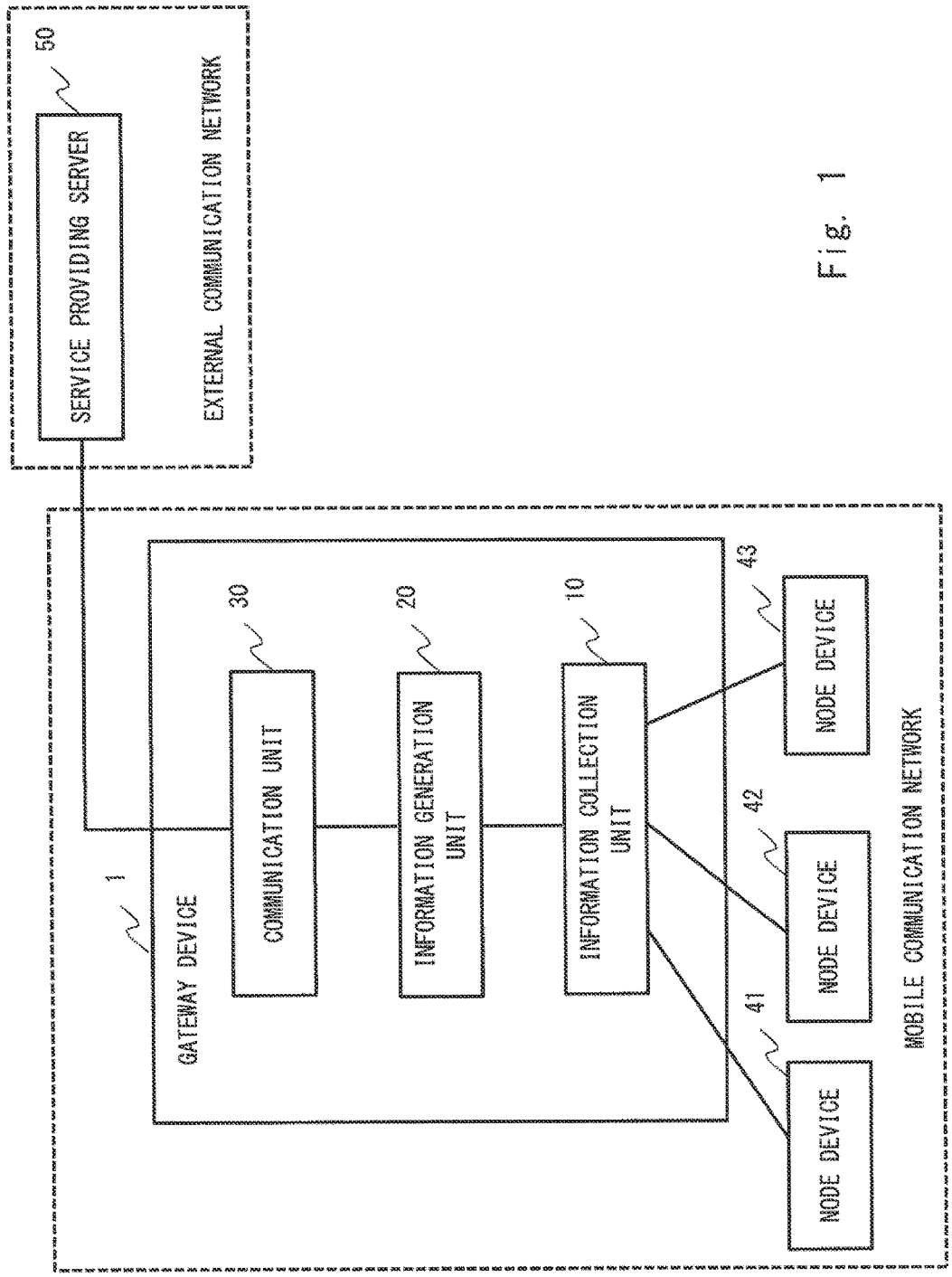
FIG. 1 is a block diagram of a service providing system according to a first exemplary embodiment.

Exemplary embodiments of the present invention are described hereinafter with reference to the drawings. First, a configuration example of a service providing system according to a first exemplary embodiment of the invention is described with reference to FIG. 1. The service providing system includes a gateway device 1, a service providing server 50, and node devices 41 to 43. The gateway device 1 includes an information collection unit 10, an information generation unit 20, and a communication unit 30.

In this figure, an example in which the service providing server 50 is located in an external communication network, and the gateway device 1 and the node devices 41 to 43 are located in a mobile communication network is described. As a configuration different from this figure, the information generation unit 20 and the communication unit 30 may be placed in a different device from the gateway device 1, and the device including the information generation unit 20 and the communication unit 30 may be located in the external communication network or in the mobile communication network.

A configuration of the gateway device 1 is described hereinafter. The information collection unit 10 receives a service information acquisition request that is required when providing a service from the service providing server 50 located in the external communication network. The service information may be the position information of a mobile communication terminal specified by the service providing server 50 or the degree of congestion in the mobile communication network caused by data transmitted in the mobile communication network, for example.

After the information collection unit 10 receives the service information acquisition request, it collects node holding information held by the node devices 41 to 43 in the mobile communication network. The number of node devices is not limited to three, and it may be three or more, or less than three. The node devices are a base station, a core network device and the like, for example. The base station may be eNodeB (evolved NodeB) defined in the 3GPP technical specification, for example. The eNodeB is a base station that employs LTE as a radio technology. The core network device may be MME (Mobility Management Entity), SGW (Serving GW), PGW (PDN GW), PCRF (Policy and Charging Rules Function) or the like defined in the 3GPP technical specification, for example. The MME mainly performs mobility management of a mobile station. The SGW relays user data transferred between the MME and the PGW. The PGW is used as an interface with an external communication network. The PCRF performs policy control and billing control in the mobile communication network.

The node holding information in a base station, for example, may be information as to whether the specified mobile communication terminal is currently connected to the base station. Alternatively, the node holding information in a MME, for example, may be information indicating a base station that manages an area where the specified mobile communication terminal is located. Besides, the node holding information may be information about a CPU utilization, a data traffic or the like in each node device, for example.

The information generation unit 20 generates mobile communication network information based on the node holding information collected from the node devices 41 to 43. The mobile communication network information may be information indicating whether the whole mobile communication network is congested based on information about the data traffic in the node devices 41 to 43, for example. Alternatively, the mobile communication network information may be information indicating whether the specified area is congested. Alternatively, the mobile communication network information may be information compiled from the node holding information collected from the node devices 41 to 43.

The communication unit 30 transmits the mobile communication network information generated in the information generation unit 20 to the service providing server 50. For example, the communication unit 30 may set the mobile communication network information to a response signal when transmitting the response signal to the service information acquisition request transmitted from the service providing server 50.

As described above, by using the service providing system shown in FIG. 1, the service providing server 50 can acquire the mobile communication network information that is generated based on the node holding information in the mobile communication network. Thus, the service providing server 50 can acquire the mobile communication information based on the node holding information that is usually known only by a telecommunications carrier that manages the mobile communication network. This increases the variety of information that can be acquired by the service providing server 50, and the service providing server 50 can use the acquired information when providing various services.

Figure 2:
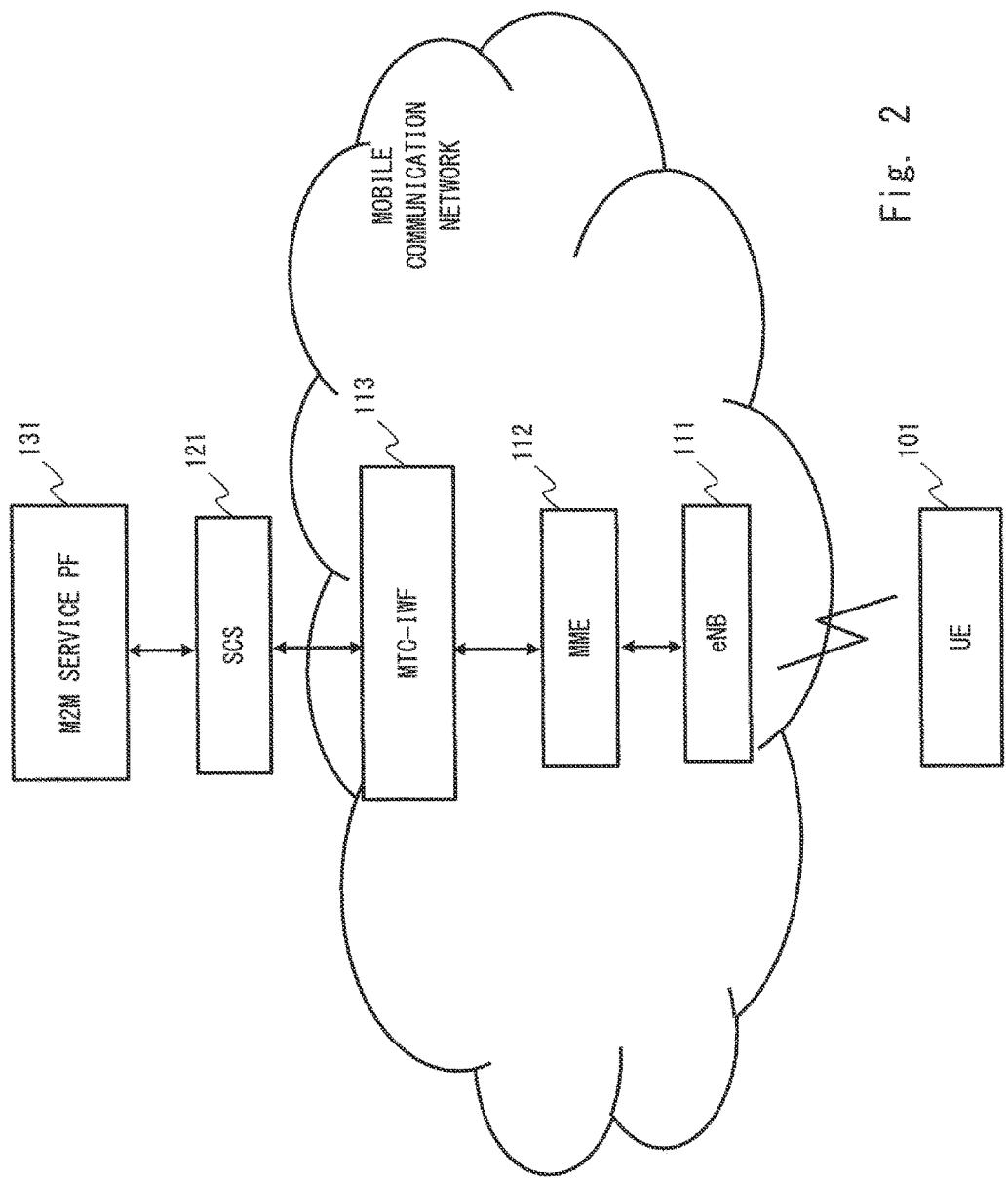
FIG. 2 is a block diagram of a service providing system according to the first exemplary embodiment.

Next, a detailed configuration example of the service providing system according to the first exemplary embodiment of the invention is described with reference to FIG. 2. The service providing system in FIG. 2 is configured using the devices defined in the 3GPP technical specification. The service providing system in FIG. 2 is composed of UE (User Equipment) 101, eNB (evolved NodeB) 111, MME (Mobility Management Entity) 112, MTC (Machine Type Communication)-IWF (Inter Working Function) 113, SCS (Service Capability Server) 121 and M2M service PF 131.

The UE 101 corresponds to the mobile communication terminal illustrated in FIG. 1. The eNB 111 and the MME 112 correspond to the node devices 41 to 43 illustrated in FIG. 1. The MTC-IWF 113 corresponds to the gateway device 1 including the information collection unit 10 illustrated in FIG. 1. The SCS 121 corresponds to the device including the information generation unit 20 and the communication unit 30 illustrated in FIG. 1. The M2M service PF 131 corresponds to the service providing server 50 illustrated in FIG. 1.

The M2M service PF 131 is located in an external communication network different from a mobile communication network. The M2M service PF 131 may be composed of one server device or may be composed of a plurality of server devices. The M2M service PF 131 notifies a service information acquisition request that is needed for providing a service to the SCS 121. Services provided by the M2M service PF 131 include a service using position information of a terminal, for example. To be more specific, when a sensor device is used as the mobile communication terminal, position information of the sensor device is acquired together with sensor information in the sensor device. When the sensor information is temperature information, the temperature of the relevant position can be detected by combination with the position information. Such a service is just an example, and the M2M service PF 131 can provide various services using the mobile communication network information.

The SCS 121 is placed between the MTC-IWF 113 and the M2M service PF 131 and converts control data, user information and the like into the format readable in each device. For example, when acquisition of position information of a certain UE is specified as the service information acquisition request notified from the M2M service PF 131, the SCS 121 may notify an identifier such as IMSI or MSISDN of the specified UE to the MTC-IWF 113. Further, the SCS 121 includes the information generation unit 20 and the communication unit 30. Thus, the SCS 121 may compile the node holding information notified from the MTC-IWF 113, generate mobile communication network information, and notify the generated mobile communication network information to the M2M service PF 131.

The MTC-IWF 113 relays communication between the SCS 121 and the node device such as the eNB 111 or the MME 112. In other words, the MTC-IWF 113 and the SCS 121 operate in coordination with each other, so that the MTC-IWF 113 and the SCS 121 serve as a gateway with the service providing server 50 located in the external communication network. The MTC-IWF 113 may be a device where the MTC server and the MTC-IWF are integrated together or a device where the MTC server and the MTC-IWF are separated from each other. The MTC-IWF 113 receives information about a service acquisition request from the SCS 121.

The MTC-IWF 113 may perform authentication as to whether the M2M service PF 131 is a recipient that is authorized as a recipient of the mobile communication network information. The MTC-IWF 113 may manage information about a list of recipients authorized as recipients of the mobile communication network information. The MTC-IWF 113 may perform authentication of the M2M service PF 131 by determining whether identification information of the M2M service PF 131 transmitted together with information related to the service information acquisition request is contained in the list of recipients managed therein.

When the mobile communication terminal to acquire position information is specified in the information related to the service information acquisition request, the MTC-IWF 113 collects the position information of the specified mobile communication terminal after performing the authentication. Because the position information of the mobile communication terminal is managed in the MME 112, the MTC-IWF 113 collects the position information from the MME 112.

The MME 112 has information of the eNB 111 that manages the area where the UE 101 is located. When collection of the position information is performed in the MTC-IWF 113, the MME 112 may transmit base station information where the UE is located to the MTC-IWF 113. The MME 112 may be located in the mobile communication network in units of prefectures or in units of regions smaller than the prefectures.

Further, when collection of the node holding information held by the eNB 111 is performed in the MTC-IWF 113, the MME 112 may collect the node holding information held by the eNB 111 and transmit it to the MTC-IWF 113. In other words, the MME 112 may relay communication between the MTC-IWF 113 and the eNB 111.

The eNB 111 performs communication with the UE 101 through a radio link. For example, the eNB 111 has the node holding information as to whether the UE 101 is currently connected or not.

The UE 101 may be a mobile phone terminal, a smartphone terminal, a notebook personal computer or the like, a moving means such as a vehicle or a train with a communication function, or a machine worn by a user such as a watch with a communication function. Alternatively, the UE 101 may be a device such as a vending machine with a communication function that does not frequently move and is controlled through a radio link.

Further, although the SCS 121 is a different device from the MTC-IWF 113 and the M2M service PF 131 in the above description, the SCS 121 may be included in the same device as the MTC-IWF 113.

Further, the node device such as the MME 112 or the eNB 111 may transmit the node holding information to the MTC-IWF 113 in response to a request from the MTC-IWF 113 or transmit it to the MTC-IWF 113 on a regular basis. Alternatively, the node device such as the MME 112 or the eNB 111 may transmit the accumulated node holding information to the MTC-IWF 113 when a certain amount of node holding information is accumulated.

Figure 3:
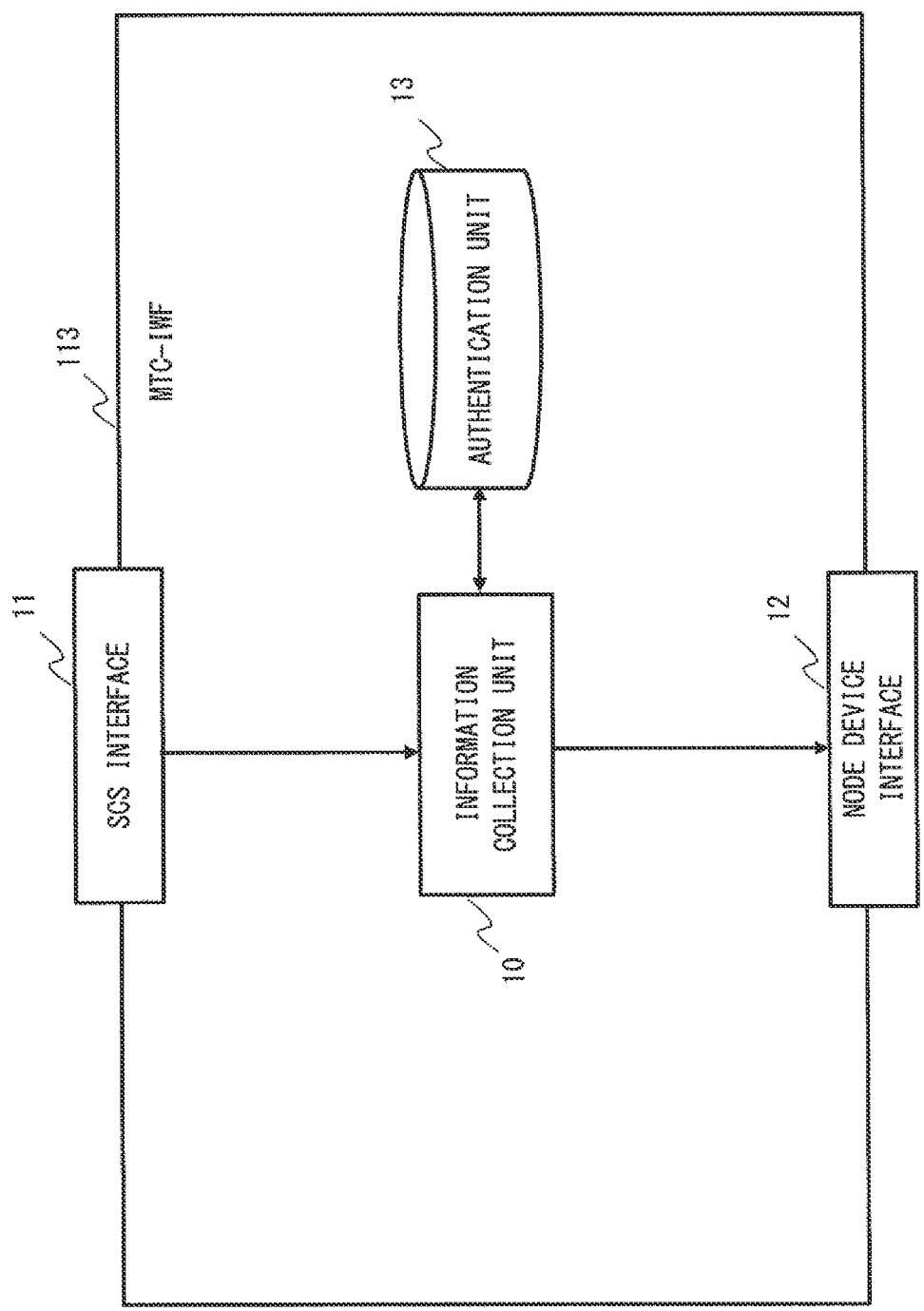
FIG. 3 is a block diagram of MTC-IWF according to the first exemplary embodiment.

A configuration example of the MTC-IWF 113 according to the first exemplary embodiment of the invention is described hereinafter with reference to FIG. 3. The MTC-IWF 113 includes an information collection unit 10, a SCS interface 11, a node device interface 12, and an authentication unit 13.

The SCS interface 11 is used for communicating with the SCS 121 and performs data communication with the SCS 121. The SCS interface 11 receives a signal related to the service information acquisition request from the M2M service PF 131 through the SCS 121. Further, the SCS interface 11 outputs the received signal to the information collection unit 10. Further, the SCS interface 11 transmits the node holding information collected in the information collection unit 10 to the SCS 121.

The node device interface 12 transmits an instruction signal for collecting the node holding information to the node device such as the MME 112 and the eNB 111. Further, the node device interface 12 receives the node holding information from the node device. The node device interface 12 outputs the received node holding information to the information collection unit 10.

The information collection unit 10 performs authentication using the identification information of the M2M service PF 131 contained in the information related to the service information acquisition request. To be specific, the information collection unit 10 performs authentication using the authentication unit 13. In the authentication unit 13, the identification information of M2M service PF that is authenticated as the other end of communication with the MTC-IWF 113 is stored.

In the authentication unit 13, the identification information of a plurality of M2M service PFs may be stored. The information collection unit 10 determines whether the identification information of the M2M service PF 131 is stored in the authentication unit 13. When the identification information of the M2M service PF 131 is stored in the authentication unit 13, the information collection unit 10 collects the node holding information through the node device interface 12. When, on the other hand, the identification information of the M2M service PF 131 is not stored in the authentication unit 13, the information collection unit 10 gives a notification of rejection of communication with the M2M service PF 131 through the SCS interface 11.

The information collection unit 10 transmits the node holding information received through the node device interface 12 to the M2M service PF 131 through the SCS interface 11.

Figure 4:
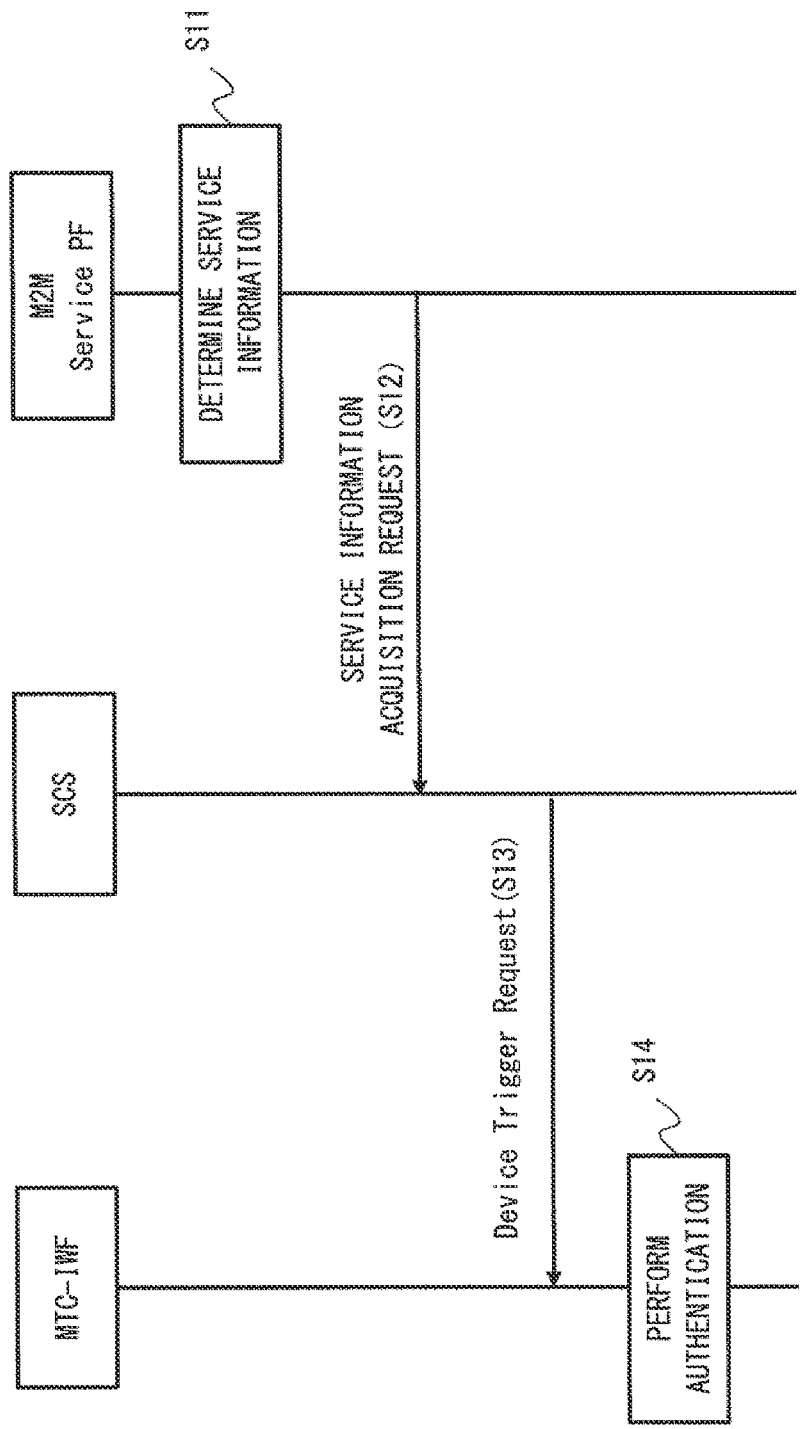
FIG. 4 is diagram showing a flow of signals between M2M service PF and MTC-IWF according to the first exemplary embodiment.

A sequence showing a flow of signals between the M2M service PF 131 and the MTC-IWF 113 according to the first exemplary embodiment of the invention is described hereinafter with reference to FIG. 4.

First, the M2M service PF 131 determines service information to be acquired from the mobile communication network in order to provide a service (S11). In this example, the M2M service PF 131 determines position information of the UE 101 as the service information. Next, the M2M service PF 131 notifies a service information acquisition request to the SCS 121 (S12).

Then, the SCS 121 transmits Device Trigger Request to the MTC-IWF 113 (S13). Device Trigger Request contains IMSI or MSISDN used for identifying the UE 101, identification information of the M2M service PF 131 or the like. It may further contain Validity period indicating the validity period of the Device Trigger Request signal, priority information of this signal, SCS ID, NW policy information and the like.

Then, the MTC-IWF 113 performs authentication of the M2M service PF 131 (S14). To be specific, the MTC-IWF 113 determines whether the M2M service PF 131 is authorized as a recipient of the mobile communication network information. The MTC-IWF 113 checks whether the identification information of the M2M service PF 131 is contained in the identification information of M2M service PF stored in the authentication unit 13.

Figure 5:
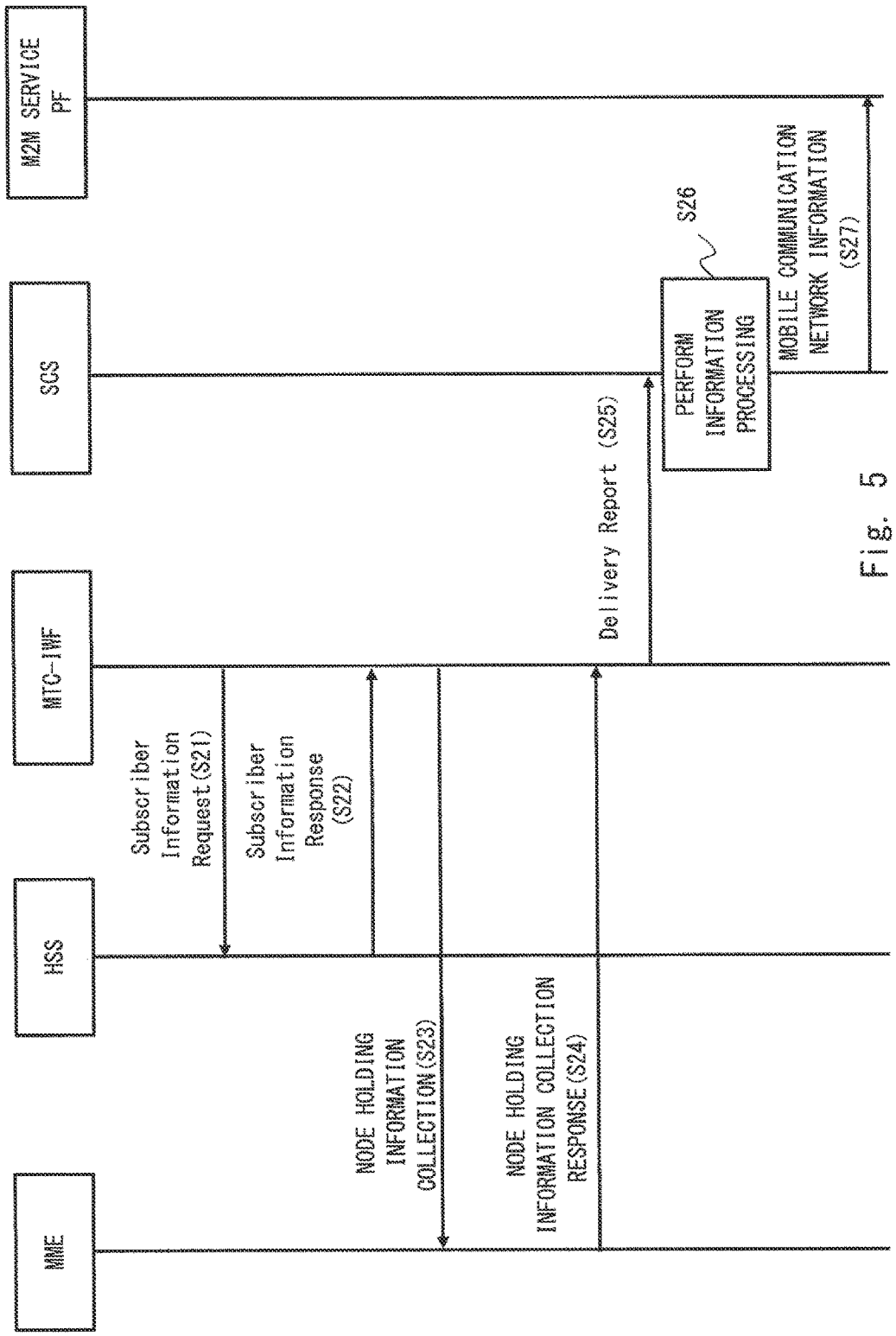
FIG. 5 is diagram showing a flow of a mobile communication network information transmitting process according to the first exemplary embodiment.

A flow of a mobile communication network information transmitting process according to the first exemplary embodiment of the invention is described hereinafter with reference to FIG. 5. First, when the MTC-IWF 113 determines to authorize the service information acquisition request transmitted from the M2M service PF 131, it is necessary to specify the MME that has the position information of the UE 101. Thus, the MTC-IWF 113 transmits Subscriber Information Request to HSS (S21). The HSS is a node device specified in the 3GPP technical specification and has subscriber information of the UE, information of the MME that manages the UE and the like. Subscriber Information Request contains MSISDN which is identification information of the UE 101, SCS ID and the like.

Then, the HSS transmits Subscriber Information Response to the MTC-IWF 113 (S22). Subscriber Information Response is a response signal to Subscriber Information Request and used to notify the identification information of the MME 112 having the position information of the UE 101 to the MTC-IWF 113.

Then, the MTC-IWF 113 notifies a signal related to node holding information collection to the MME 112 in order to acquire the position information of the UE 101 from the MME 112 notified from the HSS (S23). The signal related to node holding information collection contains IMSI or MSISDN that is used for identifying the UE 101. It may further contain Validity period indicating the validity period of the signal related to node holding information collection, priority information of this signal, SCS ID, NW policy information and the like.

Then, the MME 112 transmits a node holding information collection response signal to the MTC-IWF 113 (S24). The node holding information collection response signal contains the position information related to the UE 101. For example, as the position information related to the UE 101, base station information about a base station that manages the area where the UE 101 is located may be used. Because the base station manages the area of several km radius, for example, it is possible to specify the approximate position of the UE 101 from the position where the base station is placed.

Then, the MTC-IWF 113 transmits a Delivery Report signal to the SCS 121 (S25). Delivery Report may be used as a response signal to the Device Trigger Request signal that has been transmitted from the SCS 121 to the M2M service PF 131 in Step S13 of FIG. 4. Delivery Report contains the position information of the UE 101, which is the node holding information collected by the MTC-IWF 113.

Then, the SCS 121 generates mobile communication network information to be notified to the M2M service PF 131 (S26). For example, the SCS 121 may generate information about the location of the UE 101 that is estimated from the base station information as the mobile communication network information, rather than transmitting the base station information to the M2M service PF 131. The location of the UE 101 may be within several km radius from a specific address, for example.

The SCS 121 transmits the generated mobile communication network information to the M2M service PF 131. The M2M service PF 131 can thereby acquire the position information of the UE 101.

As described above, by using the service providing system according to the first exemplary embodiment of the invention, the M2M service PF 131 can acquire the mobile communication network information generated based on the information held by the node device in the mobile communication network. Typically, GPS information can be acquired as the position information of the UE. However, in the case of a simple radio terminal with a sensor or the like, there is a case where the GPS function cannot be provided due to restrictions such as throughput capacity. In such a case, the M2M service PF 131 can recognize the position of the UE by using the base station information or the like in the mobile communication network.

Second Exemplary Embodiment

Figure 6:
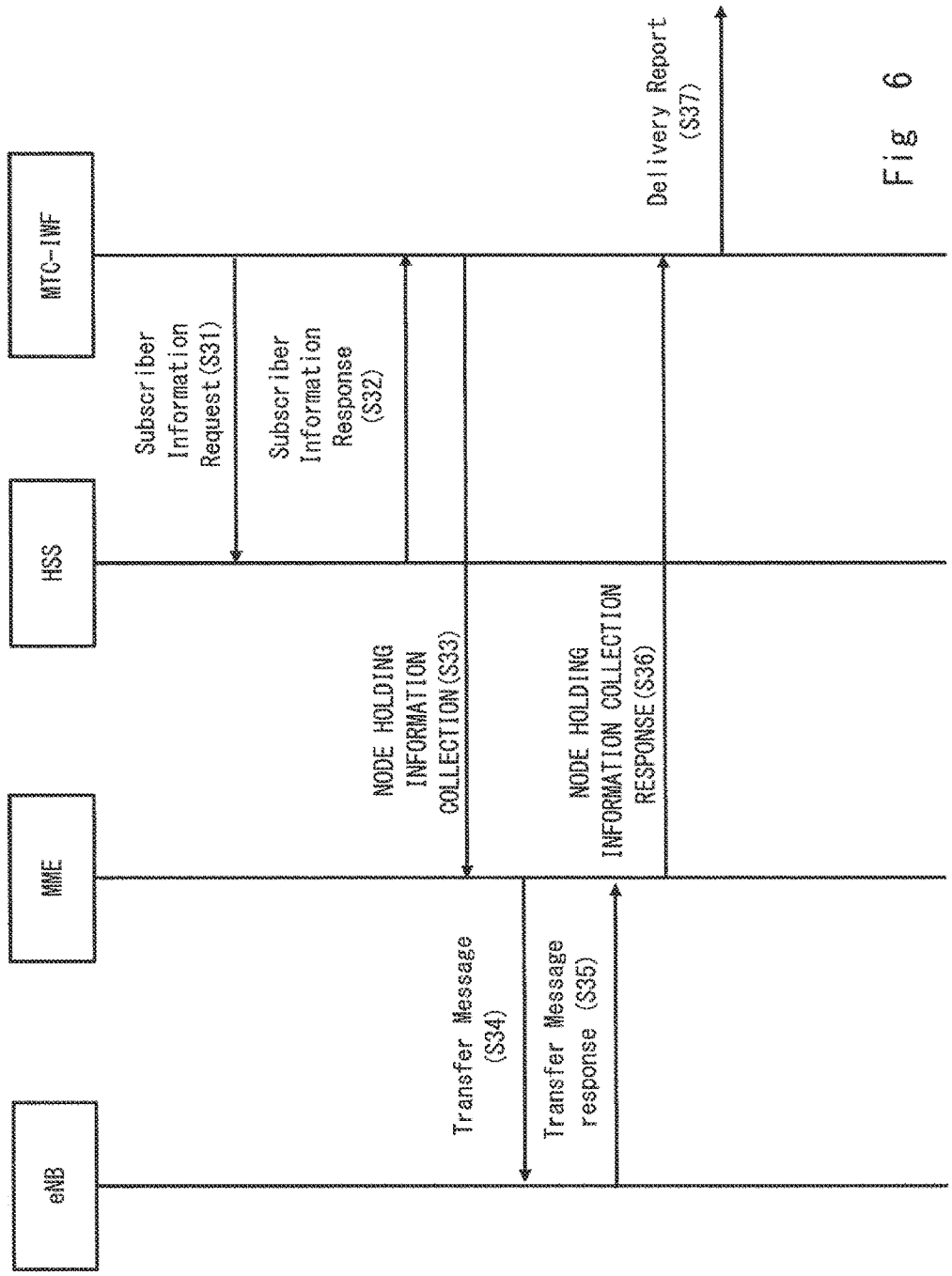
FIG. 6 is diagram showing a flow of a node holding information collection process according to a second exemplary embodiment.

A flow of a node holding information collection process according to a second exemplary embodiment of the invention is described hereinafter with reference to FIG. 6. In this exemplary embodiment, it is assumed that the M2M service PF 131 requests acquisition of band information allocated to the UE 101, QoS information and the like as the service providing information. Those information are held by the eNB 111. Therefore, the MTC-IWF 113 needs to collect the node holding information from the eNB 111.

First, the MTC-IWF 113 transmits a Subscriber Information Request signal to the HSS (S31). Subscriber Information Request contains MSISDN which is identification information of the UE 101, SCS ID and the like. Then, the HSS transmits Subscriber Information Response to the MTC-IWF 113 (S32). Subscriber Information Response is a response signal to Subscriber Information Request and used to notify the identification information of the MME 112 that manages the UE 101 to the MTC-IWF 113.

Next, the MTC-IWF 113 transmits a node holding information collection signal to the MME 112 (S33). The node holding information collection signal contains IMSI or MSISDN that is used for identifying the UE 101. Further, it contains information indicating collection of the node holding information from the eNB 111 that manages the UE 101.

Then, the MME 112 transmits a Transfer Message signal to the eNB 111 that manages the UE 101 (S34). The Transfer Message signal contains IMSI, MSISDN or the like that is used for identifying the UE 101. Further, the Transfer Message signal contains information related to an instruction for transmission of band information allocated to the UE 101. The eNB 111 receives the Transfer Message signal and transmits a Transfer Message response signal containing the band information allocated to the UE 101 to the MME 112.

Then, the MME 112 transmits the band allocation information collected from the eNB 111 as the node holding information to the MTC-IWF 113 (S36). The subsequent processing is the same as that of after Step S25 in FIG. 5 and detailed description thereof is omitted.

As described above, by using the service providing system according to the second exemplary embodiment of the invention, the MTC-IWF 113 can collect the node holding information in the eNB 111 through the MME 112. Thus, the MTC-IWF 113 can collect the node holding information in the eNB 111 through the MME 112 that manages the eNB 111 even in the case of not being able to collect the node holding information directly from the eNB 111.

Third Exemplary Embodiment

A flow of a node holding information collection process according to a third exemplary embodiment of the invention is described hereinafter with reference to FIG. 7. In this exemplary embodiment, it is assumed that the M2M service PF 131 requests acquisition of congestion degree information in a certain area in the mobile communication network as the service providing information. The information about the degree of congestion in the mobile communication network is generated based on information such as a data transfer amount in SGW and PGW. Therefore, the MTC-IWF 113 needs to collect the data transfer amount as the node holding information from the SGW and PGW.

First, the MTC-IWF 113 specifies the SGW and PGW in the area specified by the M2M service PF 131. In order to acquire MME information that manages the SGW and PGW in the specified area, the M2M service PF 131 transmits a MME information acquisition request signal to the HSS (S41). The MME information acquisition request signal may contain information about the specified area. Then, the HSS transmits a MME information acquisition request response signal containing information about the MME 112 that manages the SGW and PGW in the specified area to the MTC-IWF 113 (S42). The MME information acquisition request signal and the MME information acquisition request signal may be a Subscriber Information Request signal and a Subscriber Information Request signal, respectively.

Then, the MTC-IWF 113 transmits a SGW/PGW information acquisition request signal to the MME 112 in order to acquire SGW and PGW information in the specified area (S43). The MTC-IWF 113 may transmit the SGW/PGW information acquisition request signal to the MME at regular time intervals. For the SGW/PGW information acquisition request signal transmitted at regular time intervals, a transmission interval may be determined in advance. Further, for the SGW/PGW information acquisition request signal transmitted at regular time intervals, information for identifying the SGW or PGW as a target of information collection may be set. The SGW/PGW information acquisition request signal may contain information about the specified area. Then, the MME 112 transmits a SGW/PGW information acquisition request response signal containing the identification information of the SGW and PGW in the specified area to the MTC-IWF 113 (S44).

Then, the MTC-IWF 113 transmits a node holding information collection signal to the SGW and PGW based on the identification information of the SGW and PGW contained in the SGW/PGW information acquisition request response signal (S45). Then, the SGW and PGW that have received the node holding information collection signal transmits a node holding information collection response signal to which data traffic information in its own device is set to the MTC-IWF 113 (S46). The subsequent processing is the same as that of after Step S25 in FIG. 5 and detailed description thereof is omitted.

In information processing (Step S26 in FIG. 5) in the SCS 121, congestion degree information is generated based on the data traffic in each of the SGW and PGW, and the generated congestion degree information is notified to the M2M service PF 131. For example, when the data traffic in the SGW and PGW exceeds a predetermined threshold, a notification indicating congestion may be given to the M2M service PF 131. When the data traffic in the SGW and PGW does not exceed a predetermined threshold, a notification indicating non-congestion may be given to the M2M service PF 131. The degree of congestion may be determined using a plurality of thresholds and a plurality of levels may be set.

A flow of a node holding information collection process according to the third exemplary embodiment of the invention is described hereinafter. The flow different from FIG. 7 is described using FIG. 8.

Figure 7:
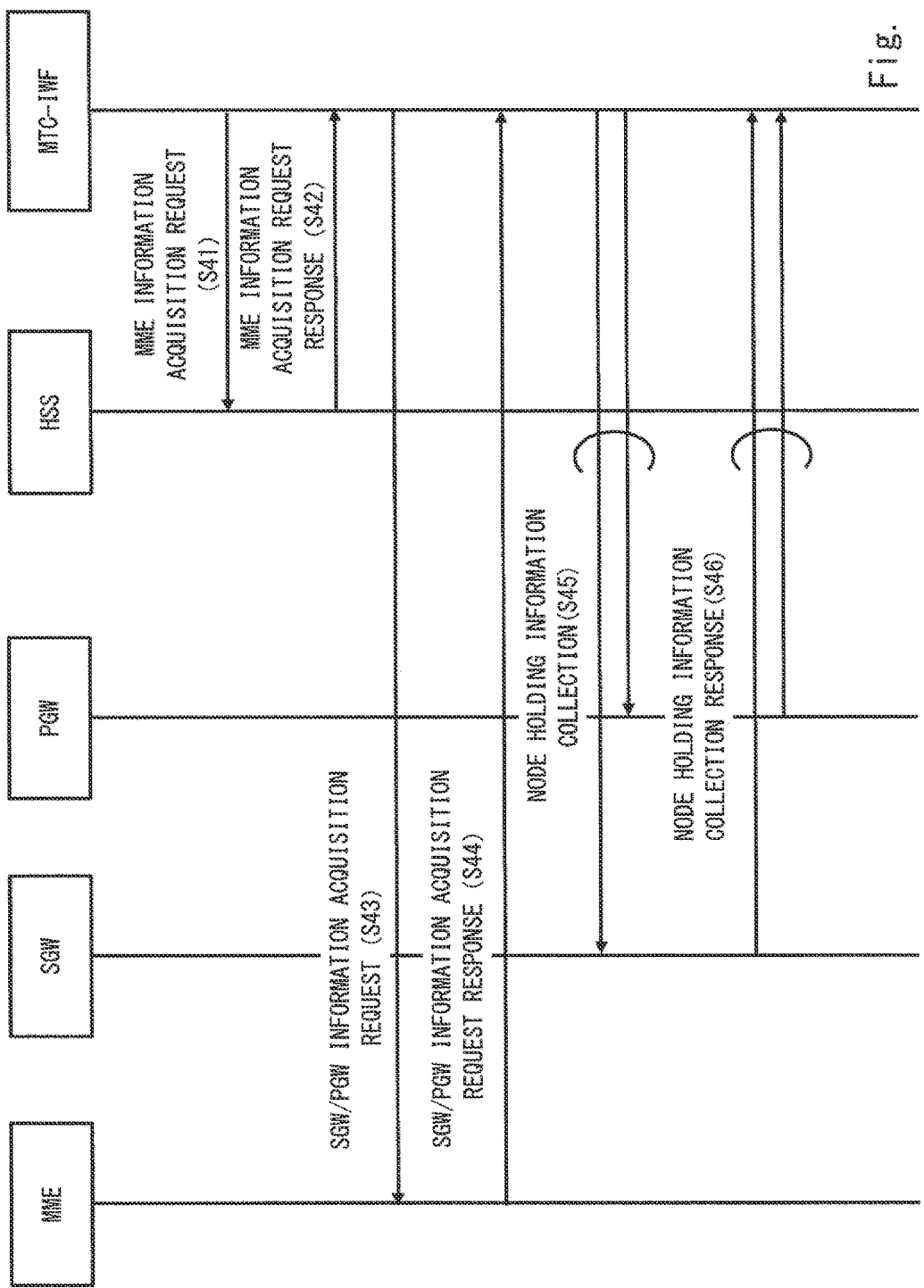
FIG. 7 is diagram showing a flow of a node holding information collection process according to a third exemplary embodiment.

Steps S51 to S53 are the same as Steps S41 to S43 in FIG. 7 and thus detailed description thereof is omitted.

Figure 8:
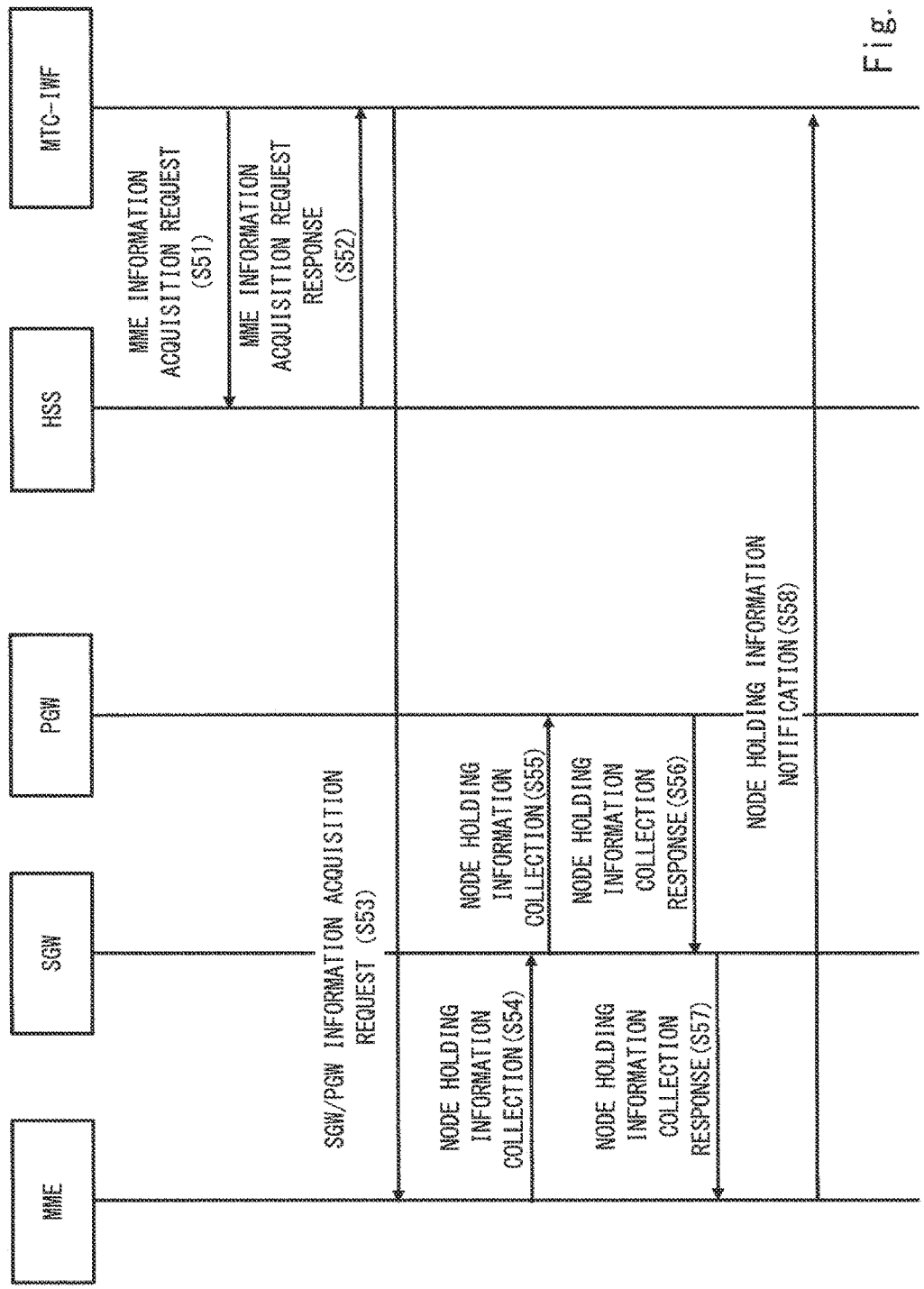
FIG. 8 is diagram showing a flow of a node holding information collection process according to the third exemplary embodiment.

Then, in Step S54, the MME 112 transmits a node holding information collection signal to the SGW in the specified area (S54). The SGW having received the node holding information collection signal then transmits the node holding information collection signal to the PGW in the specified area (S55). Then, the PGW having received the node holding information collection signal transmits a node holding information collection response signal to which data traffic information in its own device to the SGW (S56). Further, the SGW having received the node holding information collection response signal transmits data traffic information in its own device and the data traffic information in the PGW to the MME 112 (S57). The MME 112 then transmits the node holding information collected from the SGW and PGW to the MTC-IWF 113 (S58). In this manner, the MTC-IWF 113 may collect the node holding information as shown in FIG. 7 or the MTC-IWF 113 may acquire the node holding information collected by the MME 112 from the MME 112 as shown in FIG. 8.

Further, in Step S54, the MME 112 may transmit a node holding information collection signal to the eNB 111 and collect information about the data traffic in the eNB 111. In Step S58, the MME 112 may transmit the node holding information collected from the eNB 111 or transmit the node holding information about the data traffic or the like of the eNB 111 managed in its own device. Note that, in the case where the MME 112 transmits the node holding information containing information about the data traffic in the eNB 111 managed in its own device in Step S58, it is not necessary to perform the transmission of the node holding information to the SGW and PGW in Steps S54 to S57.

Further, in Step S58, the MME 112 may transmit IMEI (International Mobile Equipment Identifier) and IMSI (International Mobile Subscriber Identity), which are the identification information of the UE 101, to the MTC-IWF 113. The MME 112 may transmit the IMEI and IMSI collected from the UE 101 or transmit the IMEI and IMSI managed in its own device. The MTC-IWF 113 can perform authentication whether the UE to make a connection to the MTC-IWF 113 is used by a valid user, for example, using the IMEI and IMSI. Note that, in the case where the MME 112 transmits the node holding information containing the IMEI or IMSI of the UE 101 managed in its own device in Step S58, it is not necessary to perform the transmission of the node holding information to the SGW and PGW in Steps S54 to S57.

Further, in Step S58, the MME 112 may transmit information about the number of connections and disconnections between the UE 101 and the mobile communication network to the MTC-IWF 113. The MME 112 may transmit information about the number of connections and disconnections collected from the UE 101 or transmit information about the number of connections and disconnections of the UE 101 managed in its own device. The MTC-IWF 113 can recognize the operation of the UE and the behavior of the UE by using the number of connections and disconnections of the UE. For example, it is possible to recognize or specify the operation or behavior of the UE such as that an application running on the UE repeats connections and disconnections frequently and causes congestion of the mobile communication network. Note that, in the case where the MME 112 transmits the node holding information containing the information about the number of connections and disconnections of the UE 101 managed in its own device in Step S58, it is not necessary to perform the transmission of the node holding information to the SGW and PGW in Steps S54 to S57.

As described above, by using the service providing system according to the third exemplary embodiment of the invention, it is possible to collect information about the data traffic from the SGW and PGW. It is thereby possible to estimate the degree of congestion in the mobile communication network, and the M2M service PF 131 can acquire the degree of congestion in the mobile communication network.

Further, when notifying the degree of congestion to the M2M service PF 131, the SCS 121 may add control information according to the degree of congestion. For example, when the mobile communication network is congested, the SCS 121 may send a notification that an information delivery service through the mobile communication network in the M2M service PF 131 is not allowed. It is thereby possible to control execution of the information delivery service or the like in the M2M service PF 131 according to the degree of congestion in the mobile communication network, which enables efficient use of resources used for data communication in the mobile communication network.

Other Exemplary Embodiments

A network system in the case of applying the MTC-IWF 113 and the SCS 121 according to the first to third exemplary embodiments described above to the network defined in the 3GPP technical specification is described with reference to FIG. 9.

Figure 9:
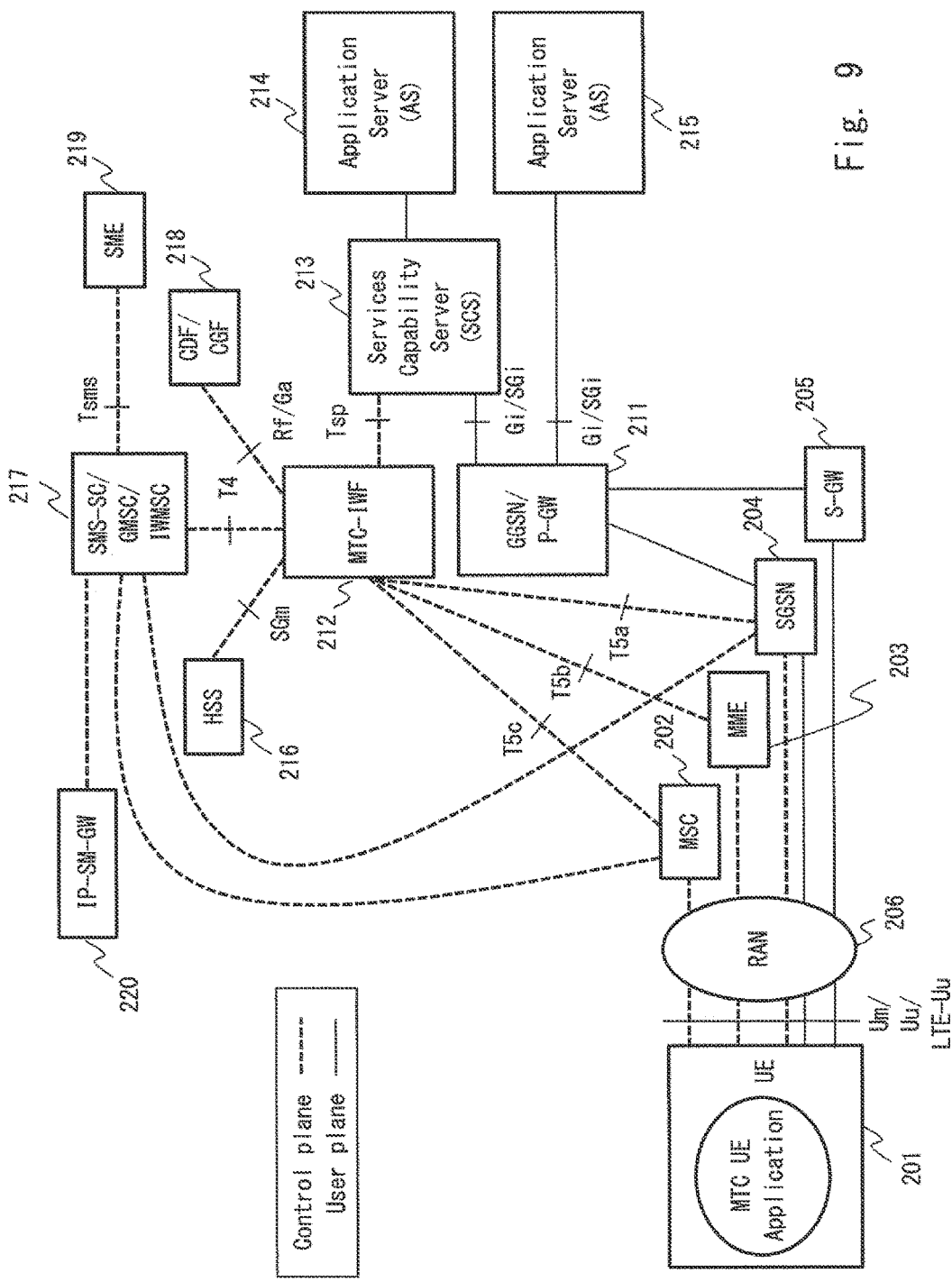
FIG. 9 is a block diagram when MTC-IWF according to the first to third exemplary embodiments is applied to a network defined in 3GPP technical specification.

The network system in FIG. 9 includes UE (User Equipment) 201, RAN (Radio Access Network) 206, MSC (Mobile Switching Center) 202, MME 203, SGSN (Serving GPRS Support Node) 204, S-GW 205, GGSN (Gateway GPRS Support Node)/P-GW 211, MTC-IWF 212, SCS 213, AS (Application Server) 214 and 215, HSS 216, SMS-SC (Short Message Service-Service Center)/GSM (registered trademark) SC/IWMSC 217, CDF (Charging Data Function)/CGF (Charging Gateway Function) 218, SME (Short Message Entity) 219 and IP-SM-GW 220.

The MTC-IWF 212 and the SCS 213 are placed to relay communication among the MSC 202, the MME 203, the SGSN 204 and the AS 214. The AS 214 is placed in an external communication network different from a mobile communication network. The MTC-IWF 212 is placed in the mobile communication network. The SCS 213 may be placed in any one of the mobile communication network and the external communication network. Thus, the location of the SCS 213 depends on a network design policy of a telecommunications carrier, an AS company or the like.

Although the present invention is described as a hardware configuration in the above exemplary embodiments, the present invention is not limited thereto. The present invention may be implemented by causing a CPU (Central Processing Unit) to execute a computer program to perform processing of the control unit in the MTC-IWF 113.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The present invention is not limited to the above-described exemplary embodiments, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-101827, filed on Apr. 26, 2012, the disclosure of which is incorporated herein in its entirety by reference.

REFERENCE SIGNS LIST

1 GATEWAY DEVICE
10 INFORMATION COLLECTION UNIT
11 SCS INTERFACE
12 NODE DEVICE INTERFACE
13 AUTHENTICATION UNIT
20 INFORMATION GENERATION UNIT
30 COMMUNICATION UNIT
41-43 NODE DEVICE
50 SERVICE PROVIDING SERVER
101 UE
111 eNB
112 MME
113 MTC-IWF
121 SCS
131 M2M SERVICE PF
201 UE
202 MSC
203 MME
204 SGSN
205 S-GW
206 RAN
211 GGSN/P-GW
212 MTC-IWF
213 SCS
214 AS
215 AS
216 HSS
217 SMS-SC/GSMSC/IWMSC
218 CDF/CGF
219 SME
220 IP-SM-GW

The invention claimed is:

1. A service providing system comprising:
an application server located in an external communication network;
a network node;
a Home Subscriber Server (HSS); and
a User Equipment (UE), wherein
the network node is configured to:
receive a request message that requests location information of the UE from the application server;
provide information indicating an error to the application server if the application server is not authorized to send the request message;
send a request message to the HSS;
receive information related to the location information of the UE from the HSS; and
send the location information to the application server,
wherein the information related to the location information of the UE received by the network node from the HSS includes identification information of a mobility management node (MME) that manages the location information of the UE,
wherein the network node is configured to:
send a request message to the MME whose identification information is the identification information received from the HSS; and
receive the location information from the MME, and
wherein the request message sent by the network node to the MME includes information indicating a validity period in which the request message sent to the MME is valid.

2. The service providing system according to claim 1, wherein the network node is configured to:
send the request message to the HSS;
receive the information related to the location information of the UE from the HSS; and
send the location information to the application server,
if the application server is authorized to send the request message.

3. The service providing system according to claim 1, wherein the request message to request the location information of the UE includes identification information of the application server.

4. The service providing system according to claim 3, wherein the network node is configured to store the identification information of the application server.

5. The service providing system according to claim 1, wherein the request message to request the location information of the UE includes identification information of the application server, and
the network node is configured to authorize the application server by determining whether the identification information of the application server is stored in the network node.

6. The service providing system according to claim 1, wherein the location information is sent by a mobility management node (MME) that manages the location information of the UE.

7. The service providing system according to claim 1, wherein the application server is configured to send a request message to request Quality of Service (QoS) information of the UE.

8. A network node comprising at least one memory storing instructions, and at least one processor configured to execute the instructions to:
receive a request message that requests location information of a User Equipment (UE) from an application server located in an external communication network;
provide information indicating an error to the application server if the application server is not authorized to send the request message;
send a request message to a Home Subscriber Server (HSS);
receive information related to the location information of the UE from the HSS; and
send the location information to the application server,
wherein the information related to the location information of the UE received by the network node from the HSS includes identification information of a mobility management node (MME) that manages the location information of the UE,
wherein the at least one processor is further configured to execute the instructions to:
send a request message to the MME whose identification information is the identification information received from the HSS; and
receive the location information from the MME, and
wherein the request message sent by the network node to the MME includes information indicating a validity period in which the request message sent to the MME is valid.

9. The network node according to claim 8, wherein the at least one processor is configured to:

send the request message to the HSS;
receive the information related to the location information of the UE from the HSS; and
send the location information to the application server, if the application server is authorized to send the request message.

10. The network node according to claim 8, wherein the request message to request the location information of the UE includes identification information of the application server.

11. The network node according to claim 10, wherein the at least one processor is further configured to execute the instructions to store the identification information of the application server.

12. The network node according to claim 8, wherein the request message to request the location information of the UE includes identification information of the application server, and
    the at least one processor is further configured to execute the instructions to authorize the application server by determining whether the identification information of the application server is stored in the network node.

13. The network node according to claim 8, wherein the location information is sent by a mobility management node (MME) that manages the location information of the UE.

14. The network node according to claim 8, wherein the at least one processor is further configured to execute the instructions to receive a request message to request Quality of Service (QoS) information of the UE from the application server.

* * * * *